June 13, 1950 H. E. BESTE 2,511,146

TELEVISION RECEIVER SYNCHRONIZING

Filed March 13, 1945 3 Sheets-Sheet 1

INVENTOR
Harold Edward Beste
BY
Charles W. Mortimer
ATTORNEY

TELEVISION RECEIVER SYNCHRONIZING

Filed March 13, 1945 3 Sheets-Sheet 2

INVENTOR
Harold Edward Beste

BY
Charles W. Mortimer
ATTORNEY

June 13, 1950 H. E. BESTE 2,511,146

TELEVISION RECEIVER SYNCHRONIZING

Filed March 13, 1945 3 Sheets-Sheet 3

Harold Edward Beste INVENTOR

BY Charles W. Mortimer

ATTORNEY

Patented June 13, 1950 2,511,146

UNITED STATES PATENT OFFICE 2,511,146

TELEVISION RECEIVER SYNCHRONIZING

Harold Edward Beste, East Rutherford, N. J., assignor to Allen B. Du Mont Laboratories, Inc., Passaic, N. J., a corporation of Delaware Application March 13, 1945, Serial No. 582,461

6 Claims. (Cl. 178—69.5)

This invention relates to the synchronization of television receivers in which the pictures are reproduced in accordance with interlaced scanning of a luminescent screen by an electron beam.

Under present standards the scanning lines on a television picture tube are displayed so that 525 lines appear as a rectangular luminescent frame every $1/30$ of a second. This frame consists of two fields, composed of 262.5 lines each, which occur every $1/60$ of a second. The lines of the two fields are timed by a synchronizing system so that the lines of the second field are displayed between the lines of the first field. This results in what is known as interlace.

Unless the synchronization of the fields is exactly correct the lines are not interlaced properly with the distances between adjacent lines equal. This results in decrease of clarity of the picture, thus making the reception less satisfactory.

By the present invention, provision is made to maintain the interlacing of the lines correct, whether the present standard scanning frequency is used or other interlaced scanning frequencies are used.

The invention may be understood from the description in connection with the accompanying drawings, in which.

Figure 2:
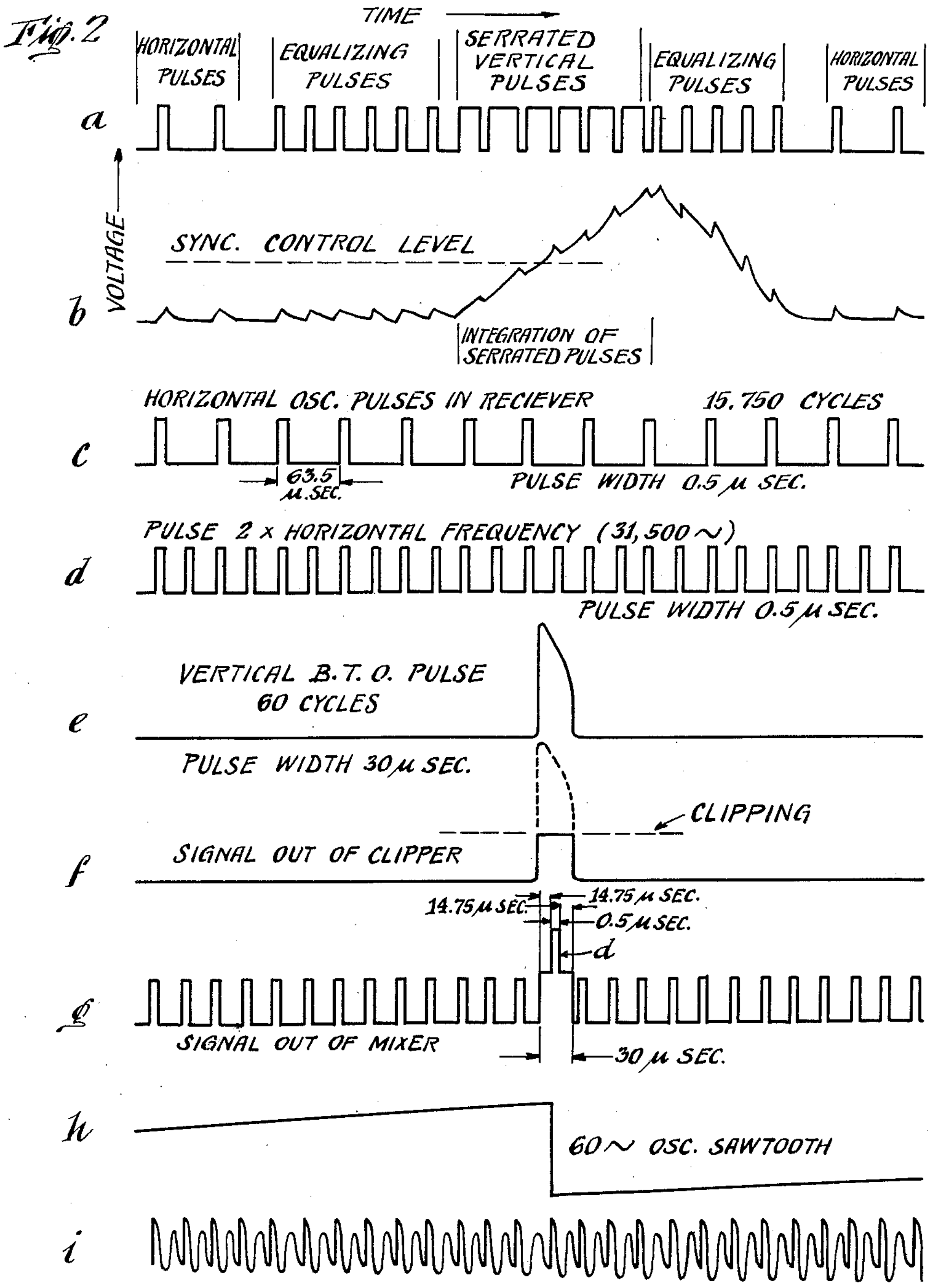
Fig. 2 shows different sorts of pulses of voltages that appear at the receiver.

In Fig. 2 the vertical and sloping lines represent voltages plotted on horizontal time base lines in the usual way. Figs. 2*a*, 2*b*, 2*c* and 2*d* are diagrams of present standard pulses or voltages that are used in television receivers.

Fig. 2*e* is a diagram of a pulse produced by this invention to be used as a keying gate to select a high frequency pulse for keeping the interlace of picture lines correct.

Fig. 2*f* is the pulse of Fig. 2*e* clipped.

Fig. 2*g* is the high frequency signal of Fig. 2*d* mixed with the clipped signal of Fig. 2*f* resulting in one of the very short pulses of Fig. 2*d* being added to the clipped pulse 2*f* thus producing a synchronizing signal.

Fig. 2*h* is the sawtooth signal which maintains correct interlace between the lines of the two picture fields of the television receiver because of the extremely accurate keying from pulse *g*.

Fig. 2*i* is the form of a wave in one of the tank circuits of the device.

Figure 1:
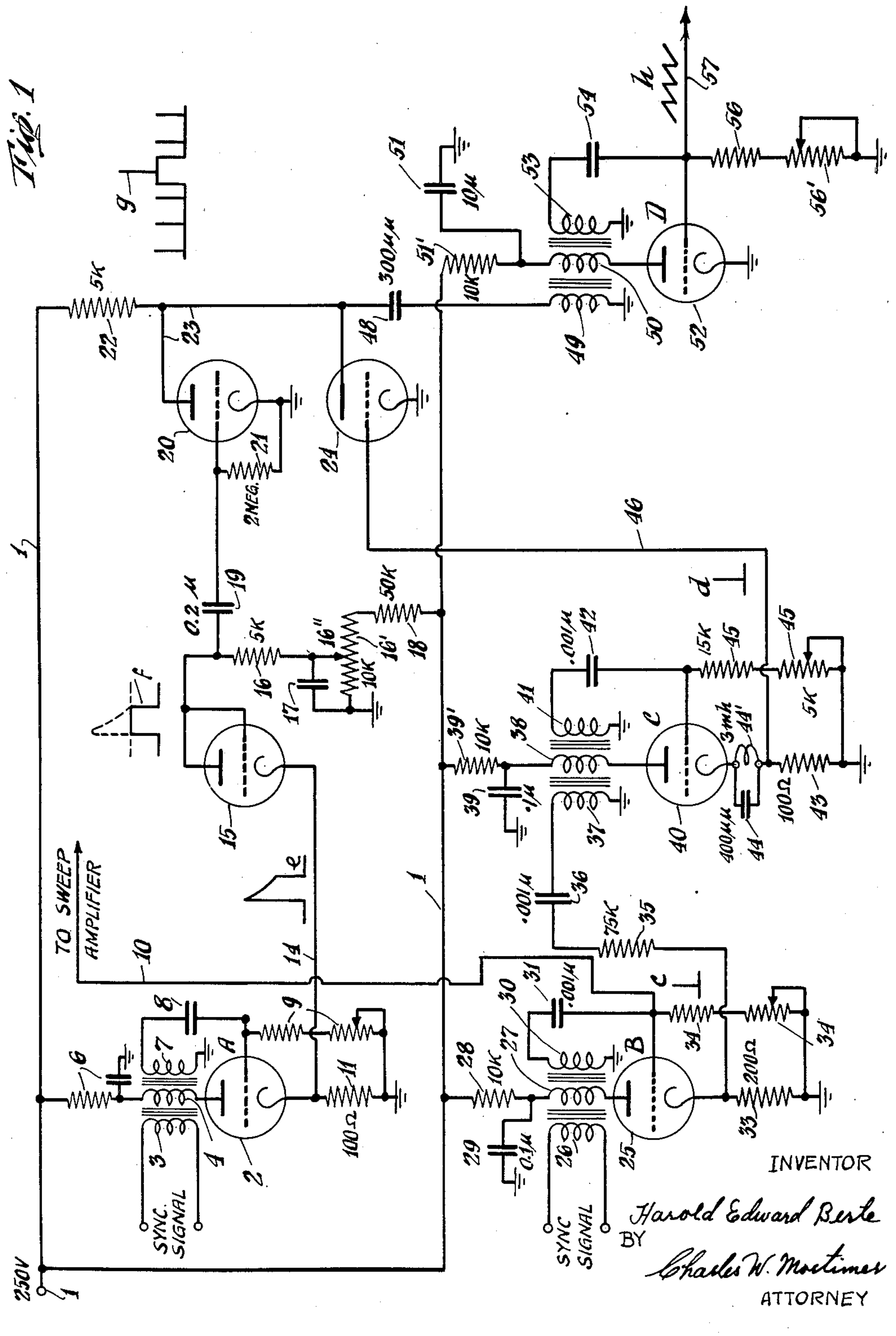
Fig. 1 is a diagram of connections for producing the correct synchronizing signals.
Figure 3:
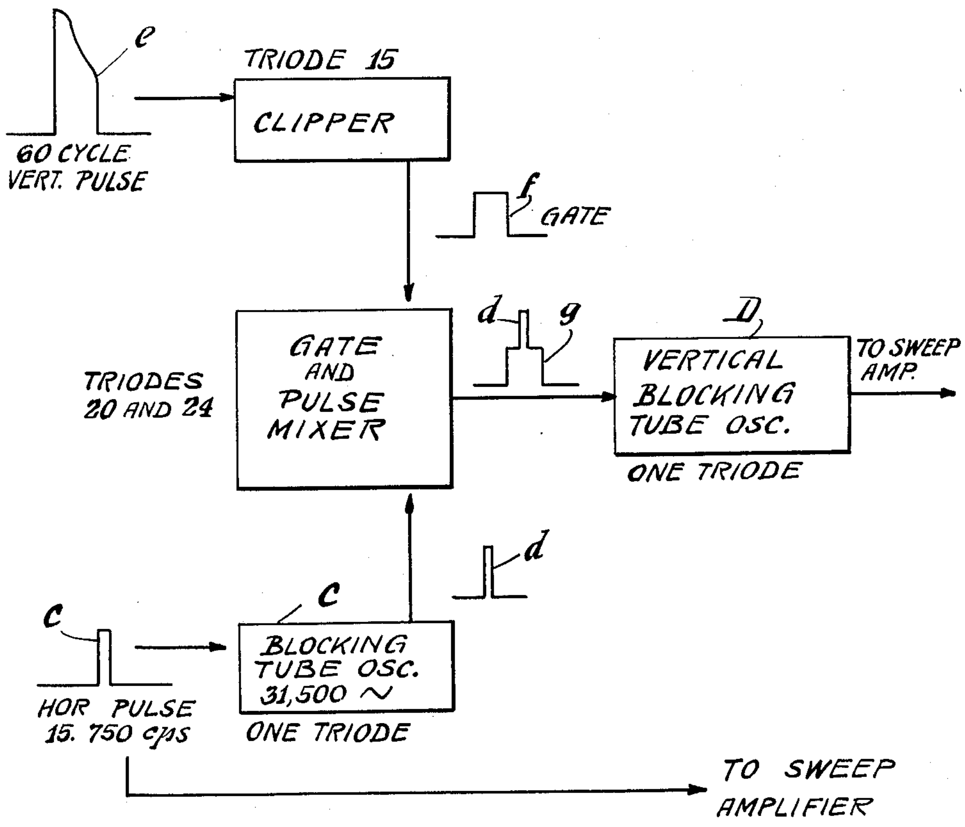
Fig. 3 is a block diagram to aid in understanding the invention.

The block diagram of Fig. 3 indicates how the signal of Fig. 2*e* is utilized to maintain correct interlace of lines in the receiver, and the apparatus shown in Fig. 1 is for producing the correct synchronizing signals for the vertical and horizontal sweep signal amplifiers that yield the sawtooth sweep signals for vertical deflection and horizontal deflection of the cathode-ray beam of the television receiver.

In the drawings, reference character 1 indicates a source of positive potential that is connected to a blocking tube oscillator A having a frequency of 60 cycles per second. An input coil 3 is shown to which a synchronizing signal is applied from any convenient source. One end of the coil 4 is connected to the plate of the vacuum tube 2 of this oscillator and the other end of this coil 4 is connected through the filter 6 to the lead 1. The other coil 7 of the transformer has one end grounded, and the other end thereof is coupled through condenser 8 to the grid of tube 2. This grid is provided with variable grid leak resistance 9. This grid is connected by lead 10 to a sweep signal amplifier, not shown. Resistor 11 is the cathode load resistor across which the pulse appears.

The resistance 11 is provided between the cathode of the tube 2 and ground. This cathode is connected by lead 14 to the cathode of the clipping tube 15. The plate and grid of tube 15 are connected to the line 1 through load resistance 16 and resistance 16′ which can be varied by the sliding contact 16″. A condenser 17 is connected in parallel with the portion of resistance 16′ that is between the contact 16″ and ground. Condenser 19 couples the plate and grid of tube 15 to the grid of tube 20 which is provided with grid leak 21 and plate load resistor 22. The plate of tube 20 is connected by lead 23 to the plate of tube 24.

The tube 25 of another blocking tube oscillator B is synchronized by a signal applied to the transformer winding 26. The coil 27 is connected to the source 1 through a filter consisting of resistor 28 and condenser 29. The other end of coil 27 is connected to the plate of tube 25. One end of the secondary winding 30 is grounded and the other end is coupled through condenser 31 to the grid of tube 25. The cathode of this tube has a load resistance 33. A variable grid leak 34 is provided for this tube 25. The cathode of tube 25 is connected by resistance 35 and condenser 36 to one end of the coil 37 of another blocking tube oscillator. The other end of this coil 37 is grounded. The coil 38 is connected through filter 39, 39′ to the lead 1 and to the plate of tube 40 of the blocking tube oscillator C that has a frequency of 31,500 cycles per second. The coil 41 has one end grounded and the other end thereof is connected through condenser 42 to the grid of tube 40. Load resistance 43 and a parallel combination of condenser 44 and inductance 44' are connected in series in the cathode circuit of tube 40. The inductance 44' and condenser 44 in parallel are tuned to 1.5 times the frequency of the oscillator C. The sine wave voltage appearing at the cathode of tube 40 serves to bias this tube alternatively on and off. When the oscillator fires a heavy pulse activates this tank circuit 44, 44' into oscillation. Its first excursion is positive in polarity, so that the tube is cut off. When it reaches its first negative excursion the tube is no longer cut off, but the time constants are such that the oscillator is not ready to fire. When the second positive excursion takes place the tube is again cut off and the tube cannot fire even if the state of the time constants would otherwise allow it to do so. When the second negative excursion of the sine wave takes place the time constants firing condition is in coincidence with the unbiased condition of the cathode, and thus the oscillator is allowed to fire. The wave form of this tank circuit 44, 44' is indicated by Fig. 2*i*. A variable grid leak resistance 45 is provided for the tube 40.

A lead 46 connects one side of the tank circuit 44, 44' in the cathode circuit of tube 40 to the grid of tube 24, the cathode of tube 24 being grounded. A condenser 48 couples the plate of tube 24 to one end of the coil 49 of another blocking tube oscillator D, the latter being adjusted to the frequency of 60 cycles per second. The coil 50 of a transformer is connected to lead 1 through the filter 51—51' to the plate of tube 52 of oscillator D. The coil 53 of this transformer has one end grounded and the upper end coupled by condenser 54 to the grid of tube 52. A variable grid leak resistance 56, 56' is provided for the tube 52. The blocking tube oscillators A and B are such as are used at present in television receivers to produce vertical and horizontal synchronizing signals, respectively. However, the transformer 4—7 of oscillator A is such that pulses produced by oscillator A are about 30 microseconds in duration, and the transformer 27—30 of oscillator B is such that a pulse of about 0.5 microsecond duration is produced.

The pulse output from the oscillator A, shown in Fig. 2*e*, is coupled directly to the cathode of the clipper tube 15. The output from this tube 15 appears across the load resistor 16. The clipping level of this tube is controlled by varying the potentiometer 16' across which only a small portion of the 250 volts supply voltage appears because of the voltage dropping resistor 18. The arm of potentiometer 16' is by-passed by condenser 17, so that voltage pulses from tube 15 appear across the load resistor 16 only. The output wave form is indicated at *f*, Fig. 1, and shown in Fig. 2*f*. This signal is coupled to the mixer tube 20 by coupling condenser 19. The grid resistor for this tube is indicated at 21.

Since the output signal from the horizontal blocking tube oscillator B is coupled to the synchronizing winding of oscillator C by resistor 35 and condenser 36, the kick-back effect from oscillator C to oscillator B is minimized. The tube 40 is a triode of which the grid is coupled to the charging condenser 42, and variable grid leak resistor 45 which fix the time constant. The pulse output from this oscillator C appears across cathode load resistor 43 of tube 40. Its wave form is indicated by *d* and a series of such pulses is shown in Fig. 2*d*. This cathode of tube 40 is directly coupled through tuned circuit 44, 44' to the grid of mixer tube 24. The plate of tube 20 is tied to the plate of tube 24. The combined wave forms of the signals *f* and *d* are applied to the grids of tubes 20 and 24 and the resultant wave form appears across the plate load resistor 22 and is indicated at *g*, Fig. 3, and shown in Fig. 2*g*. This composite wave form is coupled to the synchronizing winding 49 of transformer 50—53 by condenser 48. The blocking tube oscillator transformer windings 50—53 of the oscillator D may be of any of the well known sorts and one end of winding 50 is connected to the plate of tube 52. The condenser 51 and resistor 51' are for decoupling the oscillator pulse from the power supply. The grid of tube 52 is connected to the charging condenser 54 and grid leaks 56 and 56'. The sawtooth signal *h*, one pulse of which is also shown in Fig. 2*h* on a much larger scale, is taken off of the grid of tube 52 and coupled to the sweep amplifier of the known sort, not shown. This oscillator D is keyed or triggered off by the pulse *d* shown in Fig. 2*g*.

The keying of this oscillator O is accomplished in most conventional receivers by the pulse shown in Fig. 2*e*, which is dependent upon the integration of the vertical serrated pulse shown in Fig. 2*a* of which the integration is shown in Fig. 2*b*. This keying is tripped off at the point marked "sync control level," Fig. 2*b*. Due to noise and transients the integration slope in Fig. 2*b* does not reach the synchronizing control level consistently with respect to time because noises add to the serrated pulses being integrated and thus alters the keying time of the vertical oscillator. The result has been that the fields were not placed symmetrically so that the horizontal lines of the fields did not always interlace. The result has been that the lines of one field were not placed exactly midway between the lines of the previous field. This produced a momentary "pairing" effect, and in some instances, the lines actually overlapped each other. This adversely affected the vertical resolution of the picture.

With the present invention the two fields are kept accurately interlaced by means of a coincident circuit which greatly improves the resolution of the picture.

The operation of the system can be understood with the aid of the timing diagrams of Fig. 2 as follows:

The present standard form of the synchronizing signal that is transmitted for synchronizing television receivers is shown in Fig. 2*a*. This signal is shown for illustrative purposes. This invention is useful for synchronizing many other signals.

Fig. 2*b* shows the result produced by integrating the vertical serrated pulse of Fig. 2*a*.

Fig. 2*e* shows the sort of pulse that is produced when the oscillator A is fired by the voltage slope of the integrated pulse Fig. 2*b*.

Fig. 2*f* shows the coincidence "gate" pulse which is made by clipping the pulse *e* out of the vertical blocking tube oscillator A, Fig. 1.

Fig. 2*d* shows the pulses which occur at twice the horizontal frequency. These are necessary because the first time the gate fires, its center approximates the point that is half way between the 262nd and 263rd horizontal pulse. The second time the pulse fires the 525th pulse will ride approximately on the center of this gate. By placing an extra pulse midway of each horizontal pulse, the gate will always have a pulse riding on it, as shown in Fig. 2*g* for every field, instead of every other field, as would be the case if the double horizontal frequency pulses were not present.

Fig. 2*h* shows the second vertical blocking tube oscillator sawtooth wave form on the grid of the tube 52. This oscillator is fired by the pulse on the gate shown in Fig. 2*g*. This is where the vertical sweep is initiated which controls the placement of the fields.

It will be seen that the gate which is 30 microseconds wide can shift 14 microseconds either way due to noise, etc. without losing the pulse which is superimposed upon it. The vertical keying is made extremely accurate in this way.

The values of resistances, inductances and capacitances indicated on the drawing are for illustrative purposes.

What is claimed is:

1. In a television receiver adapted to provide interlaced scanning of lines in fields by its cathode ray tube beam, means to maintain the interlacing of the lines of one field in a fixed position with respect to the lines of another field, said means comprising a source of signals recurrent at the frequency of said fields, a second source of signals recurrent at a multiple of the frequency of said lines, and phased to have certain of said signals from said second source concurrent with said signals from said first source, a circuit element connected in common with said sources to form a combined signal, and a field frequency oscillator connected to said circuit element synchronized by said combined signal.

2. In a television receiver adapted to provide interlaced scanning of lines in fields by its cathode ray tube beam, means to maintain the interlacing of the lines of one field in a fixed position with respect to the lines of another field, said means comprising a source of signals recurrent at the frequency of said fields, a second source of signals of shorter duration than said signals from said first source and recurrent at a multiple of the frequency of said lines, and phrased to have certain of said signals from said second source concurrent with said signals from said first source, a circuit element connected in common with said sources to form a combined signal, and a field frequency oscillator connected to said circuit element synchronized by said combined signal.

3. In a television receiver adapted to provide interlaced scanning of lines in fields by its cathode ray tube beam, means to maintain the interlacing of the lines of one field in a fixed position with respect to the lines of another field, said means comprising a source of signals recurrent at the frequency of said fields, a clipper connected to said source in a polarity to flatten the tips of said signals, a second source of signals recurrent at a multiple of the frequency of said lines, and phased to have certain of said signals from said second source concurrent with said signals from said first source, a circuit element connected in common with said clipper and said source to form a combined signal, and a field frequency oscillator connected to said circuit element synchronized by said combined signal.

4. In a television receiver adapted to provide interlaced scanning of lines in fields by its cathode ray tube beam, means to maintain the interlacing of the lines of one field in a fixed position with respect to the lines of another field, said means comprising a source of signals recurrent at the frequency of said fields, a blocking oscillator recurrent at a multiple of the frequency of said lines, and phased to have certain of said signals from said second source concurrent with said signals from said first source, a circuit element connected in common with said source and said oscillator and a field frequency oscillator connected to said circuit element synchronized by said combined signal.

5. In a television receiver adapted to provide interlaced scanning of lines in fields by its cathode ray tube beam, means to maintain the interlacing of the lines of one field in a fixed position with respect to the lines of another field, said means comprising a source of signals recurrent at the frequency of said fields, a generator oscillating at the frequency of said lines, a second generator recurrent at a multiple of said frequency of said lines, and phased to have certain of said signals from said second source concurrent with said signals from said first source, a circuit element connected in common with said sources to form a combined signal, and a field frequency oscillator connected to said circuit element synchronized by said combined signal.

6. In a television receiver adapted to provide interlaced scanning of lines in a picture comprising two fields for each frame, means to maintain the interlacing of the lines of one field in a fixed position with respect to the lines of another field, said means comprising a source of signals recurrent at the frequency of said fields, a second source of signals recurrent at twice the frequency of said lines, and phased to have certain of said signals from said second source concurrent with said signals from said first source, a circuit element connected in common with said sources to form a combined signal, and a field frequency oscillator connected to said circuit element synchronized by said combined signals.

HAROLD EDWARD BESTE.

REFERENCES CITED

The following references are of record in the file of this patent:

UNITED STATES PATENTS

| Number | Name | Date |
|---|---|---|
| 2,166,688 | Kell | July 18, 1939 |
| 2,171,536 | Bingley | Sept. 5, 1939 |
| 2,183,966 | Lewis | Dec. 19, 1939 |
| 2,203,520 | Cawein | June 4, 1940 |
| 2,203,528 | Hartnett | June 4, 1940 |
| 2,249,532 | Lewis | July 15, 1941 |
| 2,398,641 | Homrighous | Apr. 16, 1946 |
| 2,418,116 | Grieg | Apr. 1, 1947 |
| 2,426,216 | Hight | Aug. 26, 1947 |

FOREIGN PATENTS

| Number | Country | Date |
|---|---|---|
| 552,072 | Great Britain | Mar. 22, 1943 |